UNITED STATES PATENT OFFICE.

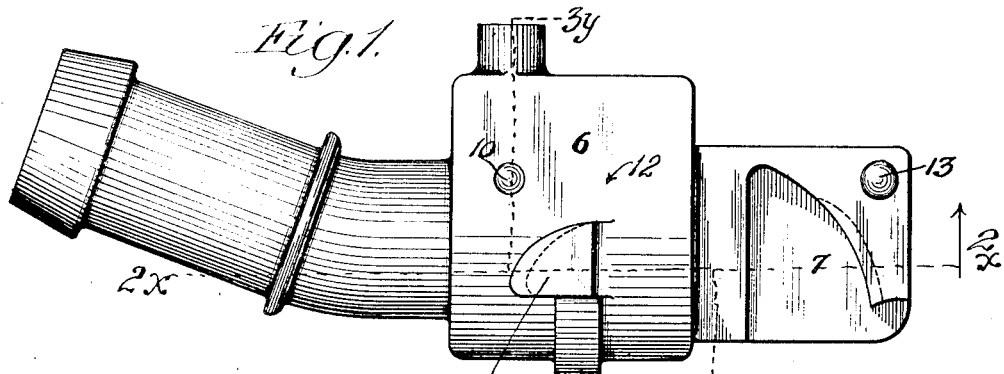
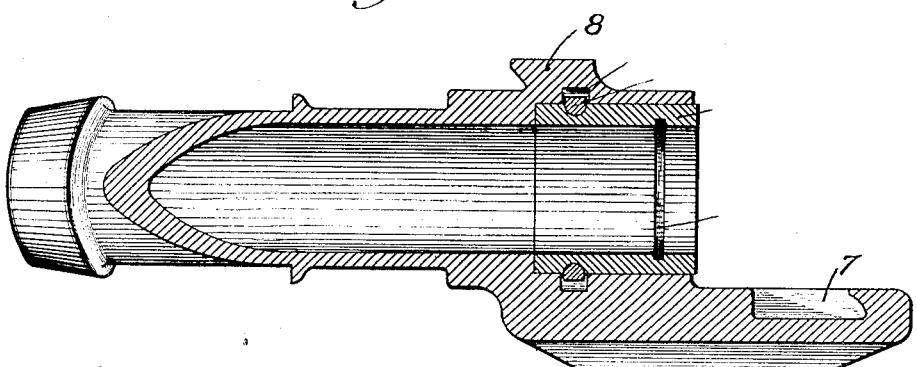
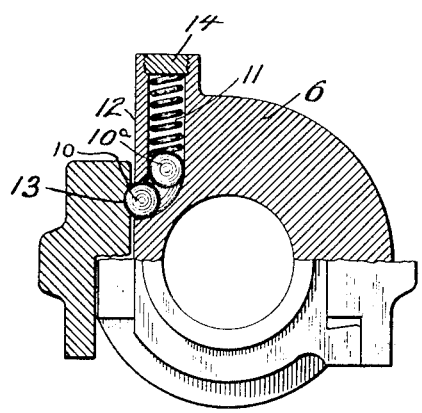

CARY WILLIAM MARTIN, OF DUNKIRK, NEW YORK, ASSIGNOR TO MARTIN CAR HEATING COMPANY, OF CHICAGO, ILLINOIS, A CORPORATION OF WEST VIRGINIA.

HOSE-COUPLING.

No. 876,071.        Specification of Letters Patent.        Patented Jan. 7, 1908.

Application filed February 23, 1904. Serial No. 194,919.

*To all whom it may concern:*

Be it known that I, CARY WILLIAM MARTIN, a citizen of the United States, and residing at Dunkirk, Chautauqua county, New York, have invented a certain new, useful, and Improved Hose-Coupling, of which the following is a full, clear, and exact description, such as will enable others skilled in the art to which it appertains to make and use the same.

This invention has reference to improvements in coupling devices for flexible or hose connections such as are used between cars of a railroad train, and has particular reference to such styles of coupling connections as are ordinarily employed in connection with the steam heating apparatus of the trains.

The object of this invention is the provision of an improved form of locking device whereby to hold the two parts of the coupler in proper relative position when the same are coupled. The above as well as such other objects as may hereinafter appear, I attain by means of a construction which I have illustrated in preferred form in the accompanying drawings, wherein Figure 1 is a side elevation of one-half of a coupling embodying my invention. Fig. 2 is a sectional view taken on the line $2^x$—$2^x$ of Fig. 1; and Fig. 3 is a sectional view taken on the line $3^y$—$3^y$ of Fig. 1.

Referring now to Figs. 1 and 2, it will be seen that I have therein shown a half coupling comprising a head or casting, 6, which is similar in shape to those commonly used in the art in general, but provided with special forms bearing on the locking attachments. The projecting locking wing, 7, is adapted to engage with the complementary locking lug or projection, 8, which extends from the locking surface, 12, of the other member or half coupling, as will be understood from the common practice in the art. In Fig. 3 I have shown the complementary parts in position of engagement. The particular means employed by me for securing the parts in interlocked position when assembled comprise a ball 10, and a spring 11, which presses the ball outwardly in position to project slightly from the side or locking face, 12 (see Fig. 3), so as to enter a recess, 13, in the projecting part or locking wing of the adjacent coupling member. A second ball $10^a$ is preferably interposed between the ball 10 and the spring, as shown. The spring, 11, and the balls, 10, are housed within the body of the casing, 6, and secured in place by a small cap or plug, 14, as shown. The operation of this mechanism is as follows. When the two half couplings are put together, which is accomplished in the usual manner, by a partial rotation of the same about a horizontal axis so as to interlock the complementary wings and lugs, 7 and 8, of the respective half couplings or members, the ball, 10, will be pressed back into the recess against the strength of the spring, 11, so as to permit movement of the parts to locking position; when it will be projected into the recess, 13, as indicated in Fig. 3, by the operation of the spring, 11, thereafter tending to resist unlocking movement but not with sufficient force to prevent the positive disconnection of the coupling when occasion requires. The intervening ball $10^a$ is chiefly desirable when the spring is arranged in a chamber or housing which, as shown, extends vertically, or in any other direction than horizontally across the coupling head, serving thus to translate the stress of the spring into a horizontally-outward thrust against the ball 10. The invention is not limited to the vertical or other particular direction of the spring-chamber.

Having thus described my invention, I claim as new, and desire to secure by Letters Patent:

1. In a hose coupling of the class described, a coupler member with its locking lug and wing, having a recess opening laterally adjacent to the engaged position of the lug and wing, with a spring-pressed ball in said recess normally projected therefrom and adapted to engage the complementary coupler member, substantially as described.

2. In a hose coupling of the class described, a coupler member with its locking surface, lug and wing, having a recess which opens through its locking surface, in combination with a spring-pressed ball arranged in said recess and normally projecting from said locking surface to engage the complementary coupler member, substantially as described.

3. In a hose coupling of the class described, a coupler member with its locking lug upon one side and locking wing upon the other side, having a recess opening through its side, in combination with two balls arranged in said recess, one ball protruding therefrom, and a spring provided in the recess and bearing upon the second ball, substantially as described.

4. In a hose coupling of the class described, a coupler member with its locking lug upon one side, and locking wing upon the other, said locking wing having at its inner upper corner a latch recess, and the body of said member having a latch recess closed at the top, and at the bottom opening through the locking surface adjacent to said locking lug, the lower part of said recess being angular, the ball 10, provided in said recess and a spring also in the recess, substantially as described.

In testimony whereof I have hereunder signed my name in the presence of the two subscribed witnesses.

CARY WILLIAM MARTIN.

Witnesses:
PAUL CARPENTER,
EDWARD C. BURNS.